(12) United States Patent
Bahl

(10) Patent No.: US 7,003,574 B1
(45) Date of Patent: Feb. 21, 2006

(54) SESSION LOAD BALANCING AND USE OF VIP AS SOURCE ADDRESS FOR INTER-CLUSTER TRAFFIC THROUGH THE USE OF A SESSION IDENTIFIER

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 09/703,973

(22) Filed: Nov. 1, 2000

(51) Int. Cl.
*G06F 15/16* (2006.01)

(52) U.S. Cl. .................. 709/228; 709/227; 709/203; 709/238; 713/201; 713/151

(58) Field of Classification Search ............. 709/219, 709/223, 227–228, 230; 713/151, 201
See application file for complete search history.

(56) References Cited

U.S. PATENT DOCUMENTS

| | | | | |
|---|---|---|---|---|
| 5,835,724 A | * | 11/1998 | Smith | 709/227 |
| 6,006,259 A | * | 12/1999 | Adelman et al. | 709/223 |
| 6,098,093 A | * | 8/2000 | Bayeh et al. | 709/203 |
| 6,363,478 B1 | * | 3/2002 | Lambert et al. | 713/151 |
| 6,598,077 B1 | * | 7/2003 | Primak et al. | 709/219 |
| 2002/0007415 A1 | * | 1/2002 | Douglis et al. | 709/230 |
| 2003/0229809 A1 | * | 12/2003 | Wexler et al. | 713/201 |

OTHER PUBLICATIONS

Lato, Greg; *Resonate Central Dispatch™: An In Depth Technical Overview*; (2000) pp. 1-15; Resonate, Inc., Sunnyvale, CA.

Nishida, et al.; *Congestion Control Mechanism for TCP with packet pair scheme*; IEICE Transactions on Information and Systems, vol. E82-D, No. 4, pp. 854-862, (Apr. 1999), retrieved from Abstract.

Hall, *Don't Ignore TCP Performance—Tuning:*, Network Computing, 1013:97, (1999).

Robel et al; *ATM WANs: Cornering The Market On Wide Area Data*; Network Computing; 1008:77, (1999).

Douglas Comer, Internetworking with TCP/IP vol. 1: Principles, Protocols, and Architecture (4th Edition) 191-229 (Prentice Hall 2000).

* cited by examiner

*Primary Examiner*—Wen-Tai Lin
(74) *Attorney, Agent, or Firm*—Microsoft Corporation

(57) ABSTRACT

A method and system for enhancing a load balancing network's ability to load balance sessions is presented. A session identifier is placed within the TCP packet to enable a new mechanism of load distribution and connection grouping within a load balancing system. Specifically, TCP is invoked by a user application to obtain a unique session identifier value. On receiving such a packet, the destination load balancing system hashes over at least the session identifier value, and the node corresponding to the results of the hash algorithm acquires the packet. This method of hashing ensures that the same node acquires all subsequently received TCP packets possessing the same session identifier regardless of the source IP address or source port information. The node then places an identical session identifier value in the form of a response session identifier in its TCP response packet. When the TCP packet with response session identifier is received at a load balancing system, the node whose session identifier matches the response session identifier acquires it.

5 Claims, 8 Drawing Sheets

SESSION LOAD BALANCING AND USE OF VIP AS SOURCE ADDRESS FOR INTER-CLUSTER TRAFFIC THROUGH THE USE OF A SESSION IDENTIFIER

TECHNICAL FIELD OF THE INVENTION

This invention relates generally to systems and methods for network server load balancing, and more particularly to systems and methods of load balancing that are capable of maintaining established sessions on a particular server.

BACKGROUND OF THE INVENTION

The expansive growth of the Internet has led to a significant transition in the way people communicate and exchange information within our society. Conventional communication tools such as handwritten letters, telephones, and fax machines have been gradually replaced as the primary means of information exchange due to the high availability and popularity of internet based tools such as e-mail messaging and the World Wide Web. Today, the Internet is a global system of computer networks connecting millions of users worldwide using a simple standard common addressing system and communications protocol called TCP/IP. People and businesses around the world can use the Internet to retrieve information, correspond with other Internet users, conduct business globally, and access a vast array of services and resources from on-line. Recent reports show that the Internet has more than 200 million users worldwide, and that number is growing rapidly.

Subsequently, the demands of this incessant growth require an even greater need for ways to maximize the user experience. Internet Service Providers (ISPs), search engines, and high volume websites all have to deal with a growing number of users and rapidly increasing numbers of requests. System administrators grappling with these demands typically respond by purchasing a larger server, but even the most powerful and expensive server can eventually fail or become overloaded. Another option is to create a network server cluster, which consists of a group of servers configured to a common IP address, to handle heavy user traffic. To effectively handle traffic of this nature, it is necessary to employ a methodology known as load balancing to distribute the traffic evenly across the group, or cluster, of commonly addressed machines to which the user is trying to access. In this way, when one machine is handling multiple user requests, new requests are forwarded to another server with more capacity. There are various types of load balancing systems, which include hardware-based solutions from vendors such as Coyote Point Systems and Foundry Networks. There are also software-based solutions such as IBM's eNetwork Dispatcher and Microsoft's Network Load Balancing (NLB) that reside directly on a machine within a network cluster.

To be effective, load balancing must occur within a cluster transparently to the client, and without jeopardizing the client's connection. Conventional load balancing systems utilize various methods, procedures or configuration rules to distribute client traffic effectively throughout the cluster. One such method is known as the Affinity Mode of operation, in which client requests are distributed according to an affinity mode selected by the network administrator of the cluster. In "no affinity" mode, a connection request is distributed amongst the cluster nodes according to the client's source IP address and source port information. In "single affinity" mode, requests are distributed according to only the source IP address. This affinity is based on information contained within an IP packet that is sent by the client in accordance with the Transmission Control Protocol (TCP) or User Datagram Protocol (UDP). Ownership of a particular IP packet is based on the results of a hash algorithm performed over fields determined by the affinity mode being used. The hash value is used to compute which node should handle the request. These current load-balancing schemes enable IP packets to be intelligently distributed to specific nodes within the cluster.

However, this intelligence is not without its limitations. Under the present scheme, some network load balancing systems are not able to determine whether one or more connections that are started by the same application, such as a Web Browser, are related. In other words, there is no common identifier between multiple connections started by the same client application. This could result in connections being balanced improperly to a different cluster node. As an example of this, consider a scenario where an online shopper establishes a connection to fill an online shopping cart from a Web Browser application. Assume further that the shopping cart is managed by a server that is a member of a load balancing cluster. The packet transmitted by the client to establish the connection would specify an IP address that was assigned by the Internet Service Provider (ISP) from its pool of addresses. If for some reason the shopper were to leave the Web Browser open for a considerable amount of time, the connection that the shopper has to the online shopping cart could be terminated. If the shopper were to return after the termination period and attempt to add items to the original shopping cart, a new connection would be established. As a result, this connection may not be directed to the cluster node that held the original shopping cart items because the new connection might be assigned a different IP address by the client's ISP. This would result in the establishment of a new shopping cart, or session, on a different node. Thus, the previous shopping cart state may be lost because they are not identifiable by the cluster as being related to the user's most recent connection.

This same problem could occur in situations where multiple clients access the network, such as the Internet, through a proxy service. This type of service or device intercepts packets transmitted and received by clients that are members of a common network, such as in a corporate intranet, and then directs the packets to the appropriate destination or source IP address on behalf of the client. Similar to the situation described above, when a client behind a proxy transmits a packet to a destination IP address, the packet is assigned the proxy IP address. If a cluster receives this packet, the cluster can only identify the proxy IP address and not the address of the client that transmitted the packet. This causes a particular problem in situations where multiple client connections related to a single session, such as when accessing a shopping cart, end up being managed by different proxies. Even though the connections are related, the different proxies would assign them to different IP addresses. A destination cluster that receives these connections could then potentially load balance the connections to different nodes based on the different addresses. Currently, most load balancing systems have no easy way of grouping or identifying connections that are all related to the same client application or initiated during the same session.

Another load balancing problem occurs when IP packets are sent from multiple clients connecting from an ISP to a server cluster. As mentioned before, all clients of an ISP share a common pool of IP addresses. When requests are sent from multiple clients at various times, the request packets may be assigned the same IP address. This could be because the client requests are intercepted by a proxy or may come through a NAT (Network Address Translation) box. If the destination cluster performs load balancing based solely on the shared IP address as in single affinity mode, all requests from the multiple clients could be distributed to one node within the destination cluster, even though the requests may belong to different users. This may result in improper load balancing in the cluster, as that one node would be overloaded with all of the client requests. As an example, consider a scenario where multiple clients are attempting to access www.foobar.com through an Internet Service Provider having a pool of addresses. When a client enters the URL www.foobar.com into their Web Browser application, a TCP packet that specifies the address of the ISP as the source IP address is transmitted to the foobar Web Server cluster that contains the Web page information for www-.foobar.com. The foobar cluster, upon receiving the TCP packet, will load balance the packet to a particular node based on the source IP address. Because the foobar cluster sees the same IP address for different users serviced by the ISP they all get directed to the same node in the foobar cluster in accordance with the single affinity mode of operation. The foobar cluster in this case would treat all of the requests coming from the ISP and assigned the same IP as a single client, when in fact the requests could be from multiple clients sharing the same IP address. The end result is improper load balancing within the foobar cluster.

A similar load-balancing problem occurs when a destination cluster attempts to communicate with a source cluster. According to some load-balancing schemes, packets sent by the destination cluster in response to requests received from the source cluster would be directed to the source VIP address, and not directly to the client that transmitted the request. This is because the request packets sent from the source cluster would all specify the source VIP address, and not the individual address of the sending node. Thus, the receiving destination cluster member would have no way of responding directly to the node within the source cluster that generated the request. Because there is currently no way for load balancing systems to specify that a response packet belongs to a particular node, the response could be load balanced to the wrong node once received by the source cluster.

The limitations discussed above apply directly to load balancing systems that utilize the "single affinity" mode of operation, in which client requests are distributed according to only a source IP address. However, there also exists a limitation within the "no affinity" mode of operation, particularly in the ability of load balancing systems to properly distribute related connections that come from the same client IP address, but from different ports. As an example, consider a scenario in which a client attempts to access a file from an FTP server cluster. Often times, FTP connections involve the downloading or uploading of large files between the client and the server, which could take considerable amounts of time depending on the size of the file. In order to speed up this process, a client can establish multiple connections to download the file. Some of these related connections could be established through a different port, or pipeline, than other connections, and would therefore be established according to a different port number. In this way, the file could be downloaded from the FTP server much more quickly than if it were being accessed through a single pipeline. However, if the FTP server cluster that receives the client request is in the no affinity mode of operation, the FTP connections could end up being load balanced to different nodes within the cluster due to the differing source port numbers of the received packets. Even though the request packets sent by the client would all specify the same client IP address and are all related to the same FTP transaction, the requests having different ports would be treated as separate connections. Obviously, this problem limits a client's ability to properly access their desired file.

BRIEF SUMMARY OF THE INVENTION

The invention provides a method for uniquely defining sessions established between a client and a server through the assignment of a session identifier value that is stored within each transmitted packet. This invention also helps to overcome the current limitations associated with load balancing network systems by allowing for a finer level of connection grouping through a session based hashing scheme.

The enhancements afforded by the invention, and the embodiments thereof, are enabled through a Session Mode of operation. According to this scheme, a client/server application invokes TCP to establish a session with a remote server. TCP is provided a session identifier value from a pool of currently unassigned session identifier values. Alternatively, TCP or a service residing on a node (locally or remotely) can be enabled to automatically assign the same session identifier to related connections i.e. those connections that are from the same source address and port and that are directed to the same destination address and port. This session identifier is stored in the TCP packet, particularly within the OPTIONS field of the TCP header, as a sender session identifier. Each subsequent packet related to the same client/server session is then assigned the same sender session identifier. In this way, all connections related to the session are commonly defined. The client packet is then transmitted from the client that is assigned a source IP address, to a server located at a destination IP address. While the invention may be implemented in various types of network devices and systems, it is particularly useful in load balancing network systems for two reasons—to load balance all connections for the same session to the same node and to ensure that responses to clients using a shared or virtual IP address as the source address are received by the right client.

When a load balancing system at the destination IP address receives the TCP packet, it is parsed to obtain the stored connection and session information. The system then uses a Session Mode based hashing mechanism to determine which node within the system will acquire the TCP packet. In Session Mode, the hashing algorithm is computed using parameters including at least the unique session identifier value specified in the packet. Once the determinant node is established, that node stores the session identifier as a "sender session identifier", in a connection descriptor that it creates for the connection. This connection descriptor information is stored in a hash table of active connections by TCP. The node then passes the packet and all subsequently received packets carrying the same session identifier up its TCP stack to the application.

To facilitate the connection request, the TCP stack of the determinant node will store the sender session identifier in the TCP control block (TCB) pertaining to the TCP connection as a response session identifier of identical value. The packet is passed further up the stack until it accesses the appropriate socket and server application. When necessary, the server application will transmit a packet in response to the received client packet. To do this, the TCP/IP stack of the determinant server node identifies the response session identifier value stored within the TCB. TCP then creates a packet that contains a response session identifier value within the OPTIONS field of the TCP header. The same response session identifier is used for all packets pertaining to the TCB, that are sent by the determinant server. The packet containing the response session identifier (identical to the sender session identifier) is then transmitted to the source IP address.

When a load-balanced system located at the source IP address receives a packet carrying a response session identifier, it checks to see if the response session identifier matches a session identifier designated by TCP. If the values match, the system accepts the packet and passes it up its TCP/IP stack to the application. Otherwise, it rejects the packet.

As an alternative to the scheme mentioned above, a session header containing the sender session identifier and destination port information can be affixed to the TCP header. The TCP header of the packet would then be modified to specify the port number of the load balancing network system to which the packet is being directed in its DESTINATION PORT field 228, as seen in FIG. 3. Likewise, a similar type of packet can be transmitted from the destination load balancing system to the source. This alternative method retains the same functionality and features of the present invention. The advantages of the present invention will become more apparent from the accompanying drawings and from the detailed description that follows.

DETAILED DESCRIPTION OF THE INVENTION

Figure 1:
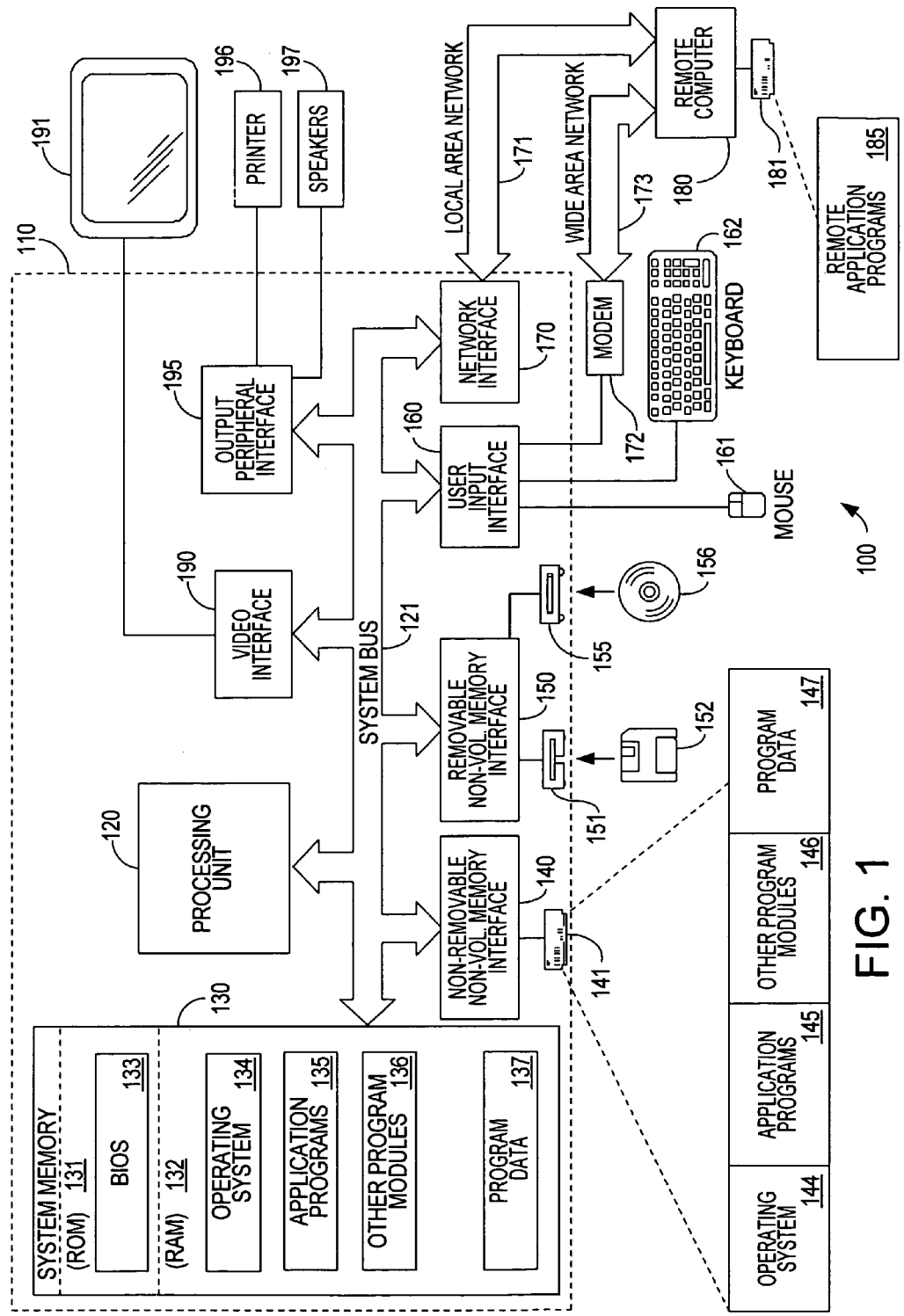
FIG. 1 is a block diagram of an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

The present invention relates to a method for uniquely defining sessions established between a client and a server through the assignment of a unique session identifier value to each packet transmitted during the session. This invention also relates to a method for enhanced load balancing to be achieved between, and within a group of nodes that are configured to a network according to a shared IP address, such as a virtual IP address. This includes, but is not limited to, a network cluster, nodes that access a network through a proxy or Network Address Translation (NAT) service, virtual private networks, and nodes that are part of a server farm. It will be recognized by those skilled in the art that the usage of a unique session identifier to define related connections, as in the present invention, allows for a finer level of connection grouping within load balancing network systems when used in conjunction with a session based hashing scheme.

In the context of a networked environment, such as that provided via the Internet, transactions are typically characterized as client/server sessions. As used herein, the term "session" refers to the establishment of one or more connections that are related to a specific application process, transaction, task or procedure. While this document makes general reference to TCP sessions, it will be appreciated by those skilled in the art that the embodiments of the invention are applicable to other TCP/IP protocol based client/server sessions. This includes, but is not limited to HTTP, FTP, SMTP, and PPTP sessions as well as UDP based protocols such as L2TP/IPSEC. On the same lines, the term "connection" should be recognized as applicable terminology to describe both TCP connections and UDP streams from a client to a server. Also, the terms "client" and "server" refer to a process of information exchange between two or more devices, wherein the server device services the request initiated by a client device. Those skilled in the art will recognize however, that the terms are as interchangeable as the client/server process itself. Thus, a dedicated server computer or device may at some point during a session act as a client that requests services, and a client computer or device can at times act as the server of that request. For this reason, the systems and methods of the invention may be embodied in traditional client machines as well as traditional server machines. Indeed, the systems and methods of the invention may be practiced in a variety of environments that require or desire the performance enhancements provided by the invention.

Figure 2:
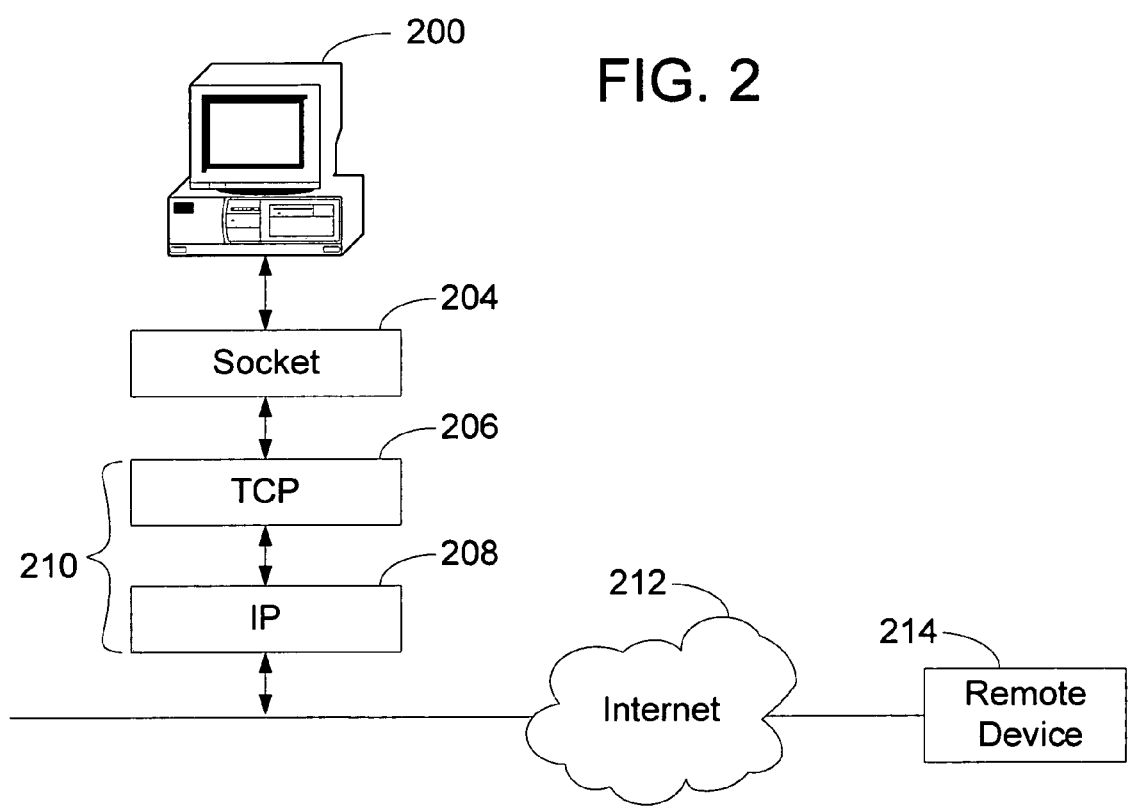
FIG. 2 is a simplified network architecture diagram showing a computer system coupled to a network for the purpose of accessing a remote device via the Internet.

With reference to the drawings, FIG. 2 illustrates a simplified architecture of a typical computer 200 for which the system and method of the invention are particularly well suited. This computer 200 is capable of executing a client/server software application according to the executable instructions specified by the application. Within this typical computer 200, the application program can transmit a data packet in response to a specific client command or process. Conceptually, the data packet is passed through a series of layers known as the TCP/IP stack 210 that provide the control and processing information needed to establish a client/server connection. A socket 204 containing the desired destination address and port information indicated by the application is passed along with the data to TCP/IP. The TCP layer 206 exists above the IP layer 208. The IP layer 208 is then coupled or connected through an ISP, proxy, NAT, etc. to a network, such as the Internet 212. This network 212 provides the ability for multiple remote devices 214, such as a PC system or handheld device, to access or send requests to and receive responses from the computer 200. However, in accordance with the teachings of the present invention, the functionality of the TCP/IP layer 210 of the computer 200 is modified to allow packets to be uniquely defined according to a specific client/server session.

Figure 3:
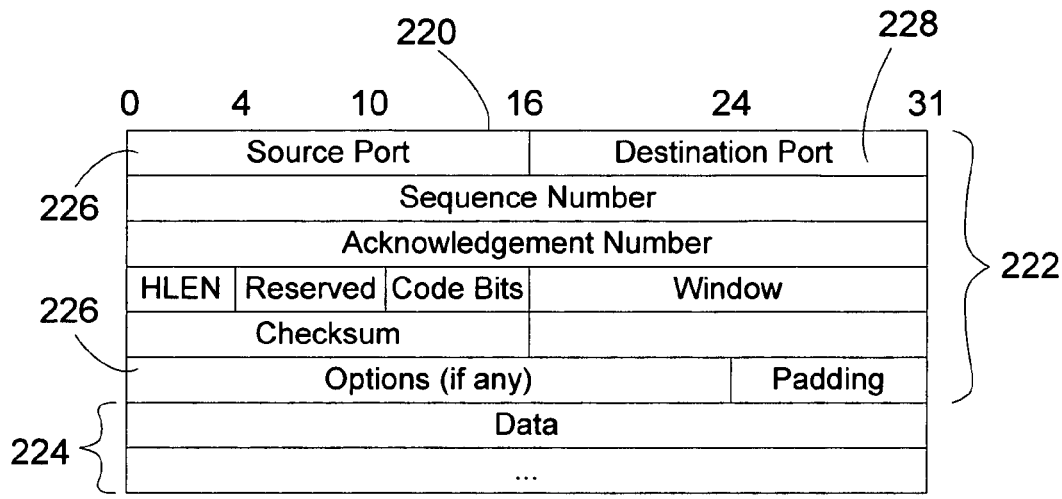
FIG. 3 is a diagram of a TCP packet illustrating the various data fields and data bit segments that comprise the packet.

Specifically, with reference to FIG. 3, the invention involves the placement of a unique session identifier value within a TCP packet 220. This TCP packet is generated by the TCP layer 206 of the TCP/IP stack 210, and serves the purpose of ensuring proper connection establishment and delivery of data to a destination application. The TCP packet contains a header section, known as the TCP header 222 followed by the data 224 to be exchanged during the connection process. The TCP header 222 carries the expected identification and control information needed for connection establishment within various data fields such as SOURCE PORT 226 and DESTINATION PORT 228, which contain the TCP port numbers that identify the application programs at the ends of the connection, with regards to the invention, the 24-bit OPTIONS field 230 is of particular interest in the present invention, as this is where in one embodiment the unique session identifier value is specified within the TCP packet. This same session identifier value is transmitted with each subsequent TCP connection packet related to a particular client/server session. This mode of operation wherein TCP/IP is enabled to identify and assign a session identifier is referred to as "Session Mode", and can be enabled/disabled through the system registry or programmatically. When disabled, the client application that invokes TCP to identify and assign a session identifier value will receive a FAILURE message.

There are two possible types of session identifiers. A sender session identifier value is specified from the client side of the client/server transaction, and a response session identifier is assigned by the server. Session identifiers are obtained by TCP from a session pool of available session identifiers. This pool consists of a range of unique values, which can be further distributed amongst a group of nodes that share a common VIP address. In this way, each node has its own exclusive set or pool of session identifier values that it can assign to a packet through TCP when establishing connections over a network. Alternatively, the application that invoked the communication process, such as a Web Browser in HTTP communications, can automatically assign a unique session identifier value for all connections related to a particular session. When assigned by an application, the session identifiers can be manufactured by the application directly or may come from a session pool maintained by a service running on the computer, or over the network. These identifiers, or sets thereof, would be unique for each respective node within the cluster. Ultimately, both of the described methods allow for the designation of a session identifier to each transmitted packet. As will be appreciated by those skilled in the art, intermediary network devices such as proxy servers or NAT systems, which manage the connection requests of multiple nodes, can also apply the aforementioned methods of the invention.

Figure 4:
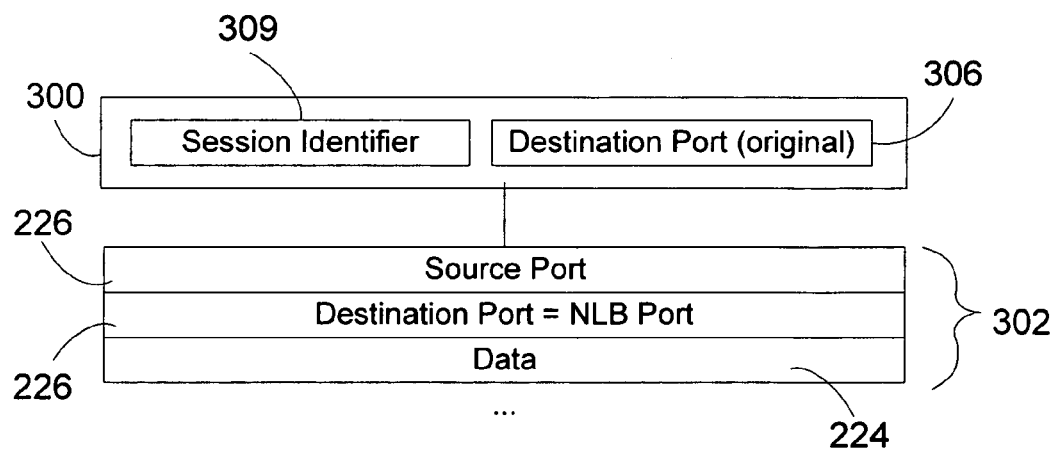
FIG. 4 is a simplified diagram of a TCP packet with a session header attached to the top of the packet that contains specific connection and identification information.
Figure 7A:
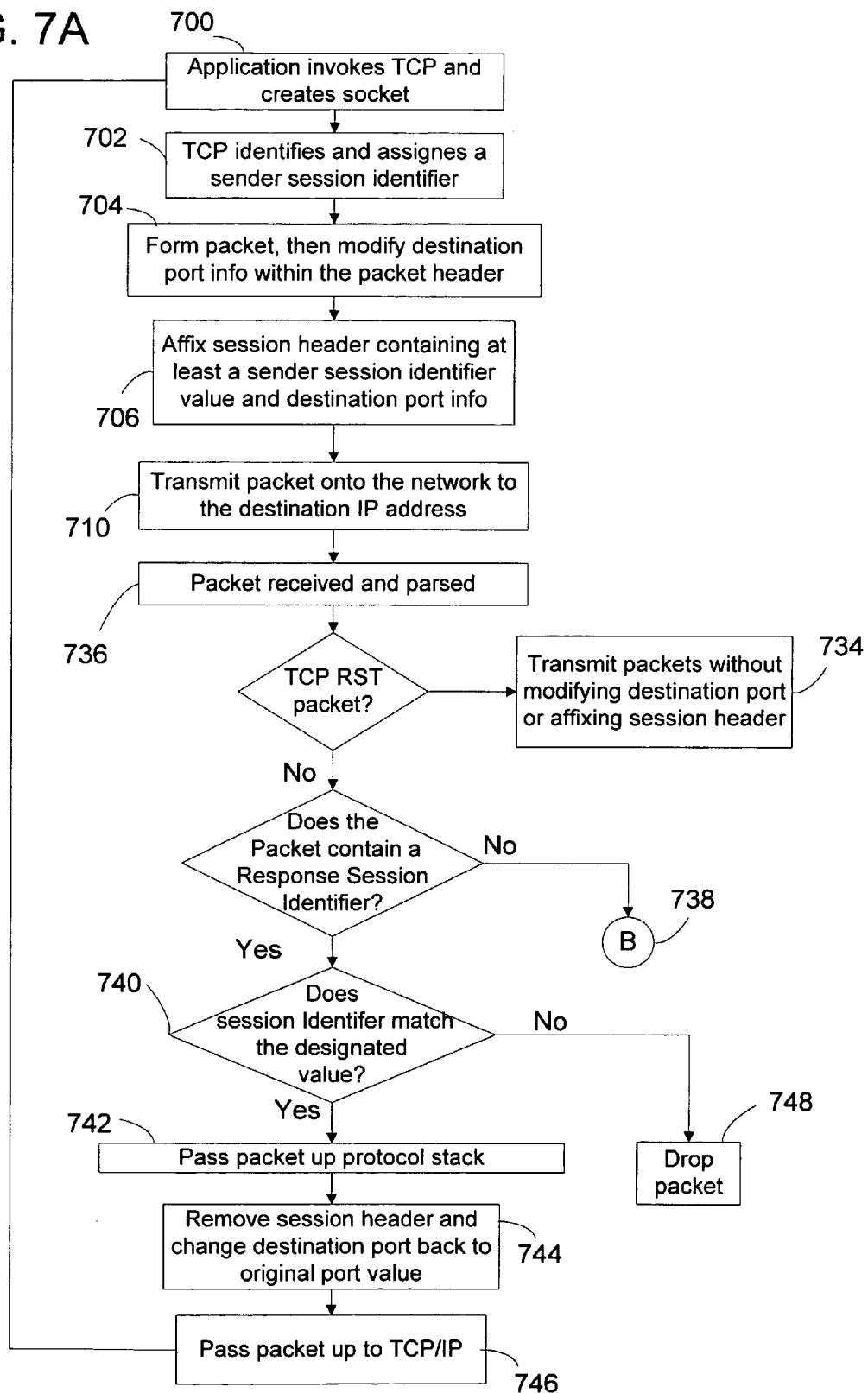
FIG. 7A is a flowchart showing steps executed in an embodiment of the invention to uniquely define a connection using a session header and the accompanying steps to identify a received connection for effective load balancing.
Figure 7B:
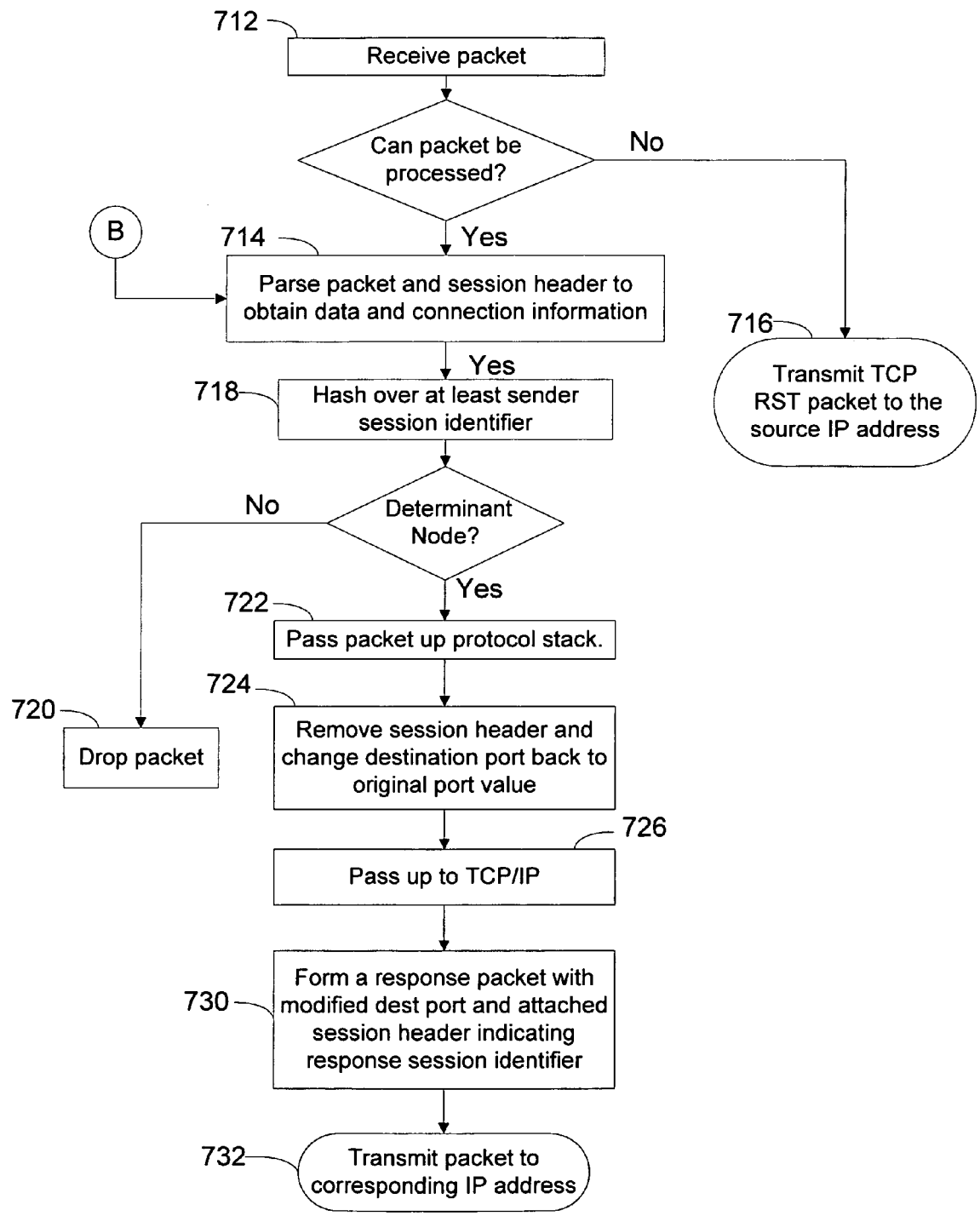
FIG. 7B is a flowchart showing steps executed in an embodiment of the invention to perform load balancing based on a uniquely defined session identifier value contained within a session header.

The assignment of a session identifier to commonly related connections could also be achieved through the addition of a session header 300 to the TCP header as shown in FIG. 4. Under this embodiment, a session header 300 is placed directly on top of the TCP header 302. As can be seen by one skilled in the art, the TCP header of FIG. 4 is simplified to show only the SOURCE PORT 226 and DESTINATION PORT 228 data fields as well as the accompanying application data 224. However, in the illustration, the DESTINATION PORT field 228 is indicated as equivalent to a NLB PORT data value. As will be further discussed with reference to FIG. 7, Event 706, this indicates a change in the original destination port number to the assigned port number of the load balancing network system at the destination IP address for which the TCP packet is to be transmitted. This port number is assigned by the Internet Assigned Numbers Authority (IANA) for exclusive use by the load balancing system. Prior to this, at event 704, a session header 300 is formed which contains the TCP designated session identifier value 304 and the destination port 306 of the end connection. As shown in the illustration, the destination port 306 is the original destination port number. TCP packets in the form shown in FIG. 4 are transmitted for each subsequent connection related to a particular client/server session.

As discussed earlier, in many client/server transactions, communication often occurs between computers that are configured to the network according to a shared IP address. Generally, computers in this arrangement are members of a cluster, which consists of other nodes that share the same address. This shared address is better known by those skilled in the art as a virtual IP address. A common functionality of such systems is network load balancing, which is a mechanism that allows packets received by the cluster to be evenly distributed among all of the nodes that comprise the system. This ensures that no single node within the arrangement of mutually addressed nodes is bombarded with more TCP packets than it can handle. Because all nodes within the cluster are assigned to the same virtual IP address, a client interacting with a cluster cannot access an individual node within the cluster directly. Rather, the client can only transmit packets to the virtual IP address, and the packets are then distributed according to the load balancing mechanism. While this setup allows load balancing to be particularly useful for managing heavy traffic received from over the network, conventional load balancing systems are not capable of effectively balancing connections that are part of the same session.

For those well versed in the art, it is known that conventional load balancing systems utilize an affinity mode based hashing algorithm to determine the distribution of incoming packets. In single affinity mode, a cluster performs load balancing by hashing over the specified source IP address, while in no affinity mode, hashing is performed over the source IP address and the source port. Unfortunately, these methods cause two distinct problems within load balancing systems. In no affinity mode, multiple connections belonging to the same session that come from the same source IP but different source ports can be serviced by different cluster members. This is problematic in that connections related to the same session should ideally be serviced by the same cluster node, but instead end up being distributed to the wrong node under this hashing scheme.

Single affinity load balancing solves this problem by distributing the load according to only the source IP address. In this way, the same node within the load balancing system always services a specific client. However, single affinity mode does not lead to a fine level of load balancing in situations where individual clients transmit connections from a shared IP address. An example of this would be when multiple clients are managed by a proxy service that has its own IP address. A proxy intercepts client packets, and then transmits them to the destination IP address from its own dedicated IP address. If this packet were to be transmitted to a load balancing system operating in single affinity mode, the load-balancing system would only be able to identify the IP address of the proxy instead of the address of the client that created the packet. As is evident to those skilled in the art, this could result in all of the individual client connections from the proxy being load balanced to the same node within the cluster because of the single affinity mode of operation.

Figure 5:
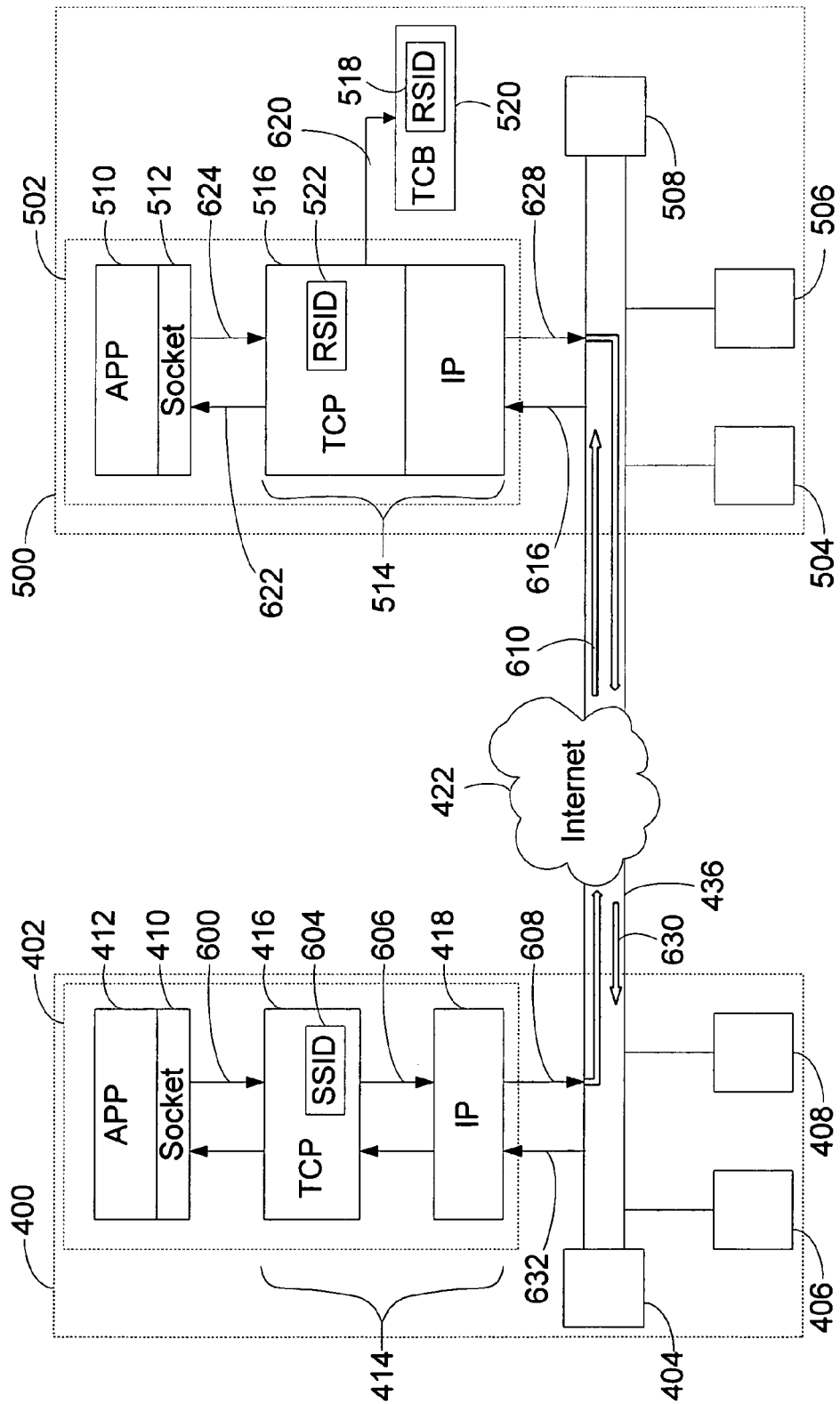
FIG. 5 is a graphical illustration of the enhanced load balancing and session identification process afforded by the present invention.

The present invention addresses the problems associated with no affinity and single affinity load balancing by enabling TCP to assign a unique session identifier to each packet transmitted for a particular client session. This feature is enabled through a Session Mode of operation within TCP/IP. Yet, to allow load-balancing systems to properly balance such connections, particularly when the communication exists between two distinct virtual IP addresses, further functionality is required of the Session Mode of operation. It will be appreciated by those skilled in the art that another key aspect of the invention is directed towards enhancing the capabilities of load balancing network systems through the usage of a "session identifier" as a parameter within a conventional hashing mechanism. The functionality of the invention can be better illustrated with reference to FIG. 5, and the flowcharts of FIGS. 6A and 6B. As shown in FIG. 5, two systems 400 and 500 have the ability to communicate with one another over a network 422 such as the Internet or an intranet. Each system is assigned to its own virtual IP address, which are shown as the hypothetical virtual IP addresses 122.x.x.x and 130.x.x.x for systems 400 and 500 respectively. Each system consists of two or more client nodes that share a common virtual IP address. System 400 is made up of four clients 402, 404, 406, and 408 that are each assigned to the 122.x.x.x IP address. Each client node is coupled to the network 422 through a transmission medium 436 including but not limited to, a network interface card and an accompanying copper or fiber optic cable/wire or wireless means.

An application 412 running on a client node 402 creates a socket 410 and transmits a data packet that is then passed to the TCP/IP layer 414, corresponding to event 600. The socket contains information including the destination address for which the data is to be transmitted, which in this case is address 130.x.x.x. As previously discussed, TCP operating at the TCP layer 416 of the protocol stack identifies a unique sender session identifier value, and places this value within the OPTIONS field of the TCP packet 416. This is shown in the TCP stack 416 as a small field labeled SSID. The TCP packet is passed on to the IP layer 418, and then transmitted onto the network 422, corresponding to events 606 and 608 respectively. Each subsequent TCP packet related to the same connection will be transmitted with the same sender session identifier value.

A system 500 assigned to a virtual IP address 130.x.x.x later receives the TCP packet transmitted from system 400 at address 122.x.x.x. The TCP packet, which contains relevant data and connection information, is then parsed in accordance with event 612. As previously discussed, conventional load balancing systems distribute, connections according to an affinity mode based hashing algorithm that is based on network and transport layer information such as IP address and optionally port number. The present invention however, utilizes an affinity mode that performs hashing based on session information. This is called the Session Mode of operation. In this mode, conventional hashing is performed using parameters which include at least the unique session identifier value obtained from parsing the TCP packet (event 614). A determinant node 502 acquires the packet and passes it up its TCP/IP stack 514 based on the results of the session based hashing (event 616).

To establish the connection, TCP on the determinant node allocates a TCP control block (TCB) (event 620), and stores the sender session identifier value within the TCP control block as a response session identifier. This is indicated in the diagram by a small field 518 labeled RSID within the TCP control block 520. The socket layer 512 is then notified (event 622) utilizing the information obtained from the parsed TCP packet, and the data is passed on to the appropriate server application 510. If necessary, the application layer 510 invokes TCP (event 624) to formulate a response to the received TCP packet. The TCP layer 516 then creates a TCP packet with a response session identifier value specified within the OPTIONS field of the TCP packet (event 626). This value is identical to the sender session identifier, and is illustrated in the diagram within the TCP stack 516 as a small field labeled RSID 522. After being passed to the IP layer, the TCP packet is transmitted onto the network (event 628).

The TCP packet containing the response session identifier is eventually received by system 400 at the source IP address (event 630). The member nodes, in accordance with the Session Mode of operation, will check to see if the session identifier specified within the received packet belongs to its session identifier pool (event 632). If the response session identifier matches a particular nodes session identifier pool, that node acquires the packet and the packet is passed up the TCP/IP stack 414 (event 634), and eventually to the application layer 412. The client/server process as described herein is repeated for the duration of the session existent between the source and destination addresses. As can be easily seen, the response packet is acquired by the same node that transmitted the original TCP packet, thus facilitating a process by which to effectively manage connections related to a session even between two load balancing network systems.

Figure 6A:
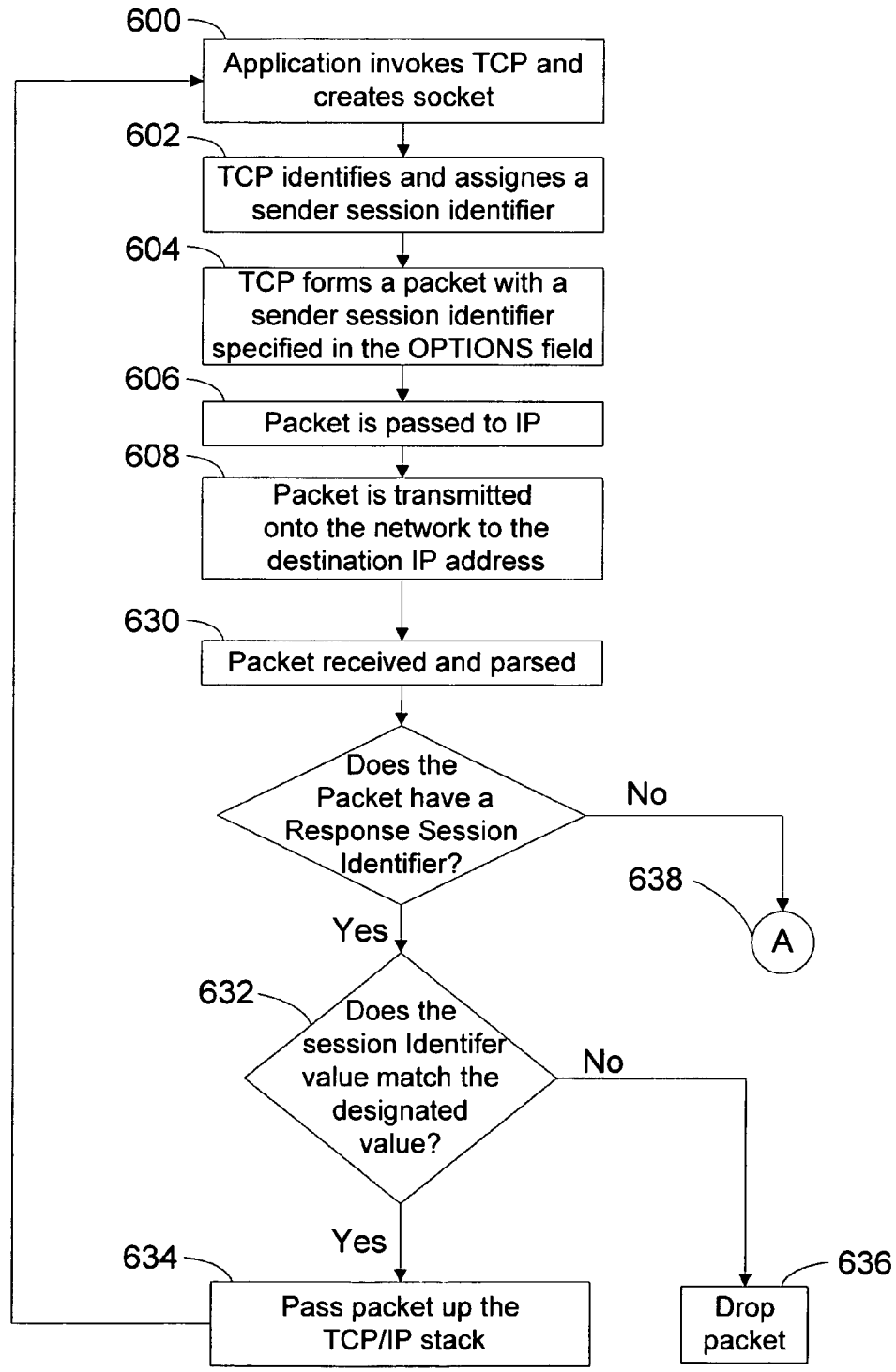
FIG. 6A is a flowchart showing steps executed in an embodiment of the invention to uniquely define a connection and the accompanying steps to identify a received connection for effective load balancing.
Figure 6B:
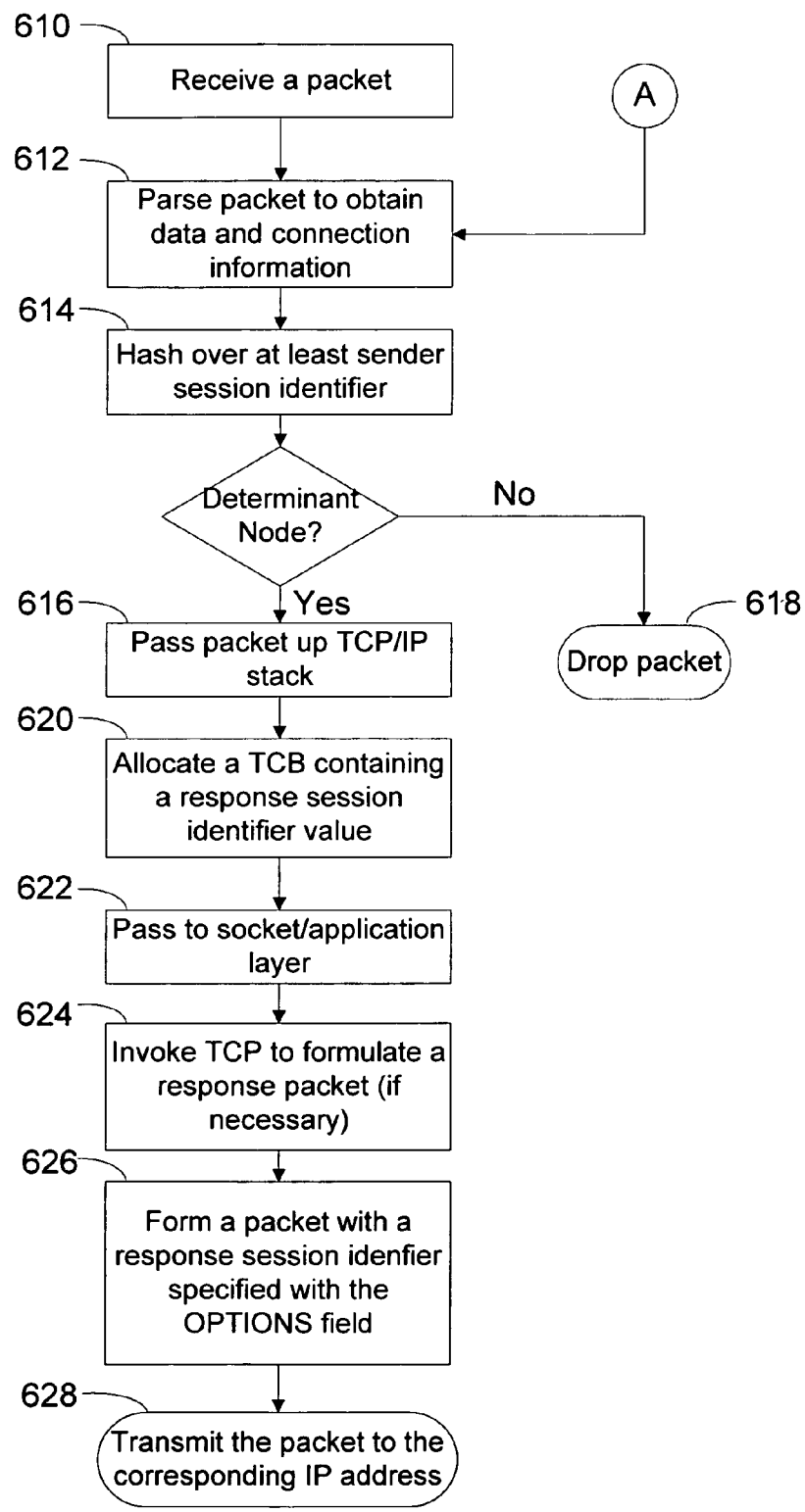
FIG. 6B is a flowchart showing steps executed in an embodiment of the invention to perform load balancing based on a uniquely defined session identifier value.

As an alternative, the TCP packet as shown in FIG. 4 can be used to uniquely define transmitted TCP packets. As illustrated in the flow charts of FIGS. 7A and 7B, the same general procedure as described in FIGS. 6A and 6B is applied, but with some slight modifications. When an application 412 invokes TCP 416, TCP identifies and assigns a unique sender session identifier, corresponding to events 602 and 702. However, instead of placing the sender session identifier value within the TCP OPTIONS field as in event 604, a session header 300 carries this information. In accordance with this implementation, a TCP packet is formed, but modified such that the DESTINATION PORT field 228 is actually the IANA assigned destination port number of the load balancing system for which the packet is to be transmitted (event 704). Then, a session header that contains at least the sender session identifier 304 and the destination port information 306 is affixed to the TCP packet 302 (event 706). The packet with attached session header is then passed onto the network 422 (event 710). This process is repeated for all subsequent packets transmitted during the same session.

The system 500 later receives the packet with attached session header from system 400 (event 712). This is because the destination port in the TCP header is specified as that of the load balanced system 500. If the system is capable of processing packets of the form shown in FIG. 4, the session header and packet are parsed to obtain the connection and session information (event 714). Hashing is then performed in a known manner using at least the session identifier value obtained from the packet (event 718). This hashing mechanism is performed in accordance with the Session Mode of operation. It will be appreciated by those skilled in the art that other parameters may be used in addition to the session identifier for this computation. Once a determinant node is computed, the packet is passed up the protocol stack of the determinant node (event 722). The session header is then removed, and the destination port specified in the TCP header is changed to the destination port value specified in the session header (event 724). Having undergone this modification, the packet is passed up to the TCP/IP stack 514 of the determinant node (events 726) and processed normally.

In situations in which the destination system 500 is not properly configured to process received packets of the form shown in FIG. 4, (i.e. the destination system is not running an embodiment of the invention), a TCP RST packet is transmitted by TCP/IP to the source IP address to signal a connection termination to the client node (event 716). This RST indicates to the client 402 that the intended destination server is not capable of processing packets having an affixed session header. This would alert the client that the destination could not process its request. With this awareness, the client would know that subsequent packets transmitted to system 500 would have to be transmitted without attaching a session header and without modifying the destination port in the TCP header as in the packet of FIG. 4 (event 734).

When a response to the client is necessary, a response packet is formed, and the destination port is modified to specify the assigned port number of the load balancing system that the packet is being transmitted to. As before, a session header 302 containing a session identifier value 309 and the original destination port value 306 is affixed to the modified packet 302. However, the session identifier is stored within the header as a response session identifier that is identical to the sender session identifier (event 730). Once this response packet is received and parsed by the load balancing system 400 (event 736), the sending client node 402 is able to easily recognize the response to its request by identifying its own uniquely designated session identifier value as specified within the session header (event 740). The packet is then passed up the protocol stack (event 742), where the client machine 402 removes the session header and changes the destination port to the value specified in the session header (event 744)—in this case the original client application port. Finally, the packet is passed up the TCP/IP stack and eventually to the appropriate client application (event 746).

As can be easily recognized by those skilled in the art, the alternative method described above allows related connections to be defined according to a unique session identifier value, but does not require direct modification of packets by the TCP stack as in the first method (such as modification of the TCP OPTIONS field by TCP). Instead, the method involves the attachment/detachment of a session header and the modification of the destination port within the TCP header without the intervention of TCP/IP. In other words, the process occurs before a packet is passed to the TCP/IP stack or after the packet is formed by the TCP/IP stack—thus, the entire process occurs transparently to TCP/IP. As will be further appreciated by those skilled in the art, this functionality can be achieved through various means of implementation. For instance, changing of the destination port number in the TCP header to the assigned port number of the load balancing system and the attachment/detachment of the "session header" can both be accomplished by using an "interception" shim. The shim "intercepts" the packet through a callback function that is executed by the TCP stack, which then enables the shim to receive the packet and modify it accordingly. Furthermore, the assignment/removal of a session header can be performed in a manner that is totally transparent to the TCP/IP stack by placing the shim below the TCP/IP stack and above the network interface driver. In this way, the interception shim could be in the form of a mini-port driver that lies between the IP driver and the network interface driver of a particular node. Within a load balancing system, such a driver could be placed upon each node within the system.

As mentioned earlier, the enhancements afforded by this invention can apply to any system in which a group of nodes are configured to a network through a shared IP address or virtual IP address. While systems 400 and 500 in FIG. 5 are shown only as a collection of commonly addressed nodes, it will be appreciated by those skilled in the art that they graphically depict any network configurations that require or desire the usage of a shared or virtual IP address.

Overall, the invention provides a simple, efficient and versatile way in which to allow connections related to a specific session to be defined. This applies more specifically to any sessions that require or desire the usage of the TCP/IP protocol suite, including sessions based on TCP/IP packet encapsulation. Furthermore, by employing the Session Mode of operation within network systems, the discussed limitations associated with single affinity and no affinity based load balancing systems are easily overcome. This is possible through the usage of the more distinctive "session identifier" as a parameter for which to perform conventional hashing to determine load distributions. Because each connection related to a specific client/server transaction is uniquely defined, packets can be readily identified by load balancing systems and distributed independently of the source IP address and source port values. Such functionality prevents instances where multiple client requests coming from a single IP address are directed to, and eventually overloaded onto a single cluster node as in the single affinity mode of operation. This invention also prevents related connections having the same IP address but different source ports, such as when a client downloads a file, from being improperly distributed to different nodes within the system as in the no affinity mode of operation. Furthermore, the placement of a response session identifier within the packets transmitted to clients that are members of a system such as 400 ensures that responses are directed properly to the client throughout the duration of the session. In this way, sessions can be load balanced properly in both the client and server systems.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

What is claimed is:

1. A method for enabling sessions established between a client and a server to be uniquely defined to enhance the performance of a load balancing system, the method comprising the steps of
    invoking a client-side TCP process,
    identifying an available session identifier for uniquely identifying the sessions between the client and the server,
    forming a packet to be transmitted over a network to a destination IP address, the packet containing information that includes at least the sender session identifier,
    transmitting the packet to the destination IP address, and
    wherein the step of invoking a client-side TCP process includes generating a FAILURE response, if the client-side TCP process is not enabled to identify and assign the same session identifier to related connections.

2. A method for enhancing the performance of a load balancing system, the method comprising the steps of
    receiving a packet from a source IP address, the packet including at least a session identifier,
    parsing the received packet to identify at least the session identifier,
    hashing over at least the session identifier to determine which node within the load balancing system will acquire the received packet,
    acquiring the packet by a single node based on the results of the hashing step wherein all subsequently received packets containing the same session identifier are acquired by the same node, and
    establishing a connection between the source IP address and the destination IP address by allocating a TCP control block for the connection, and
    wherein the steps of acquiring comprises
    verifying the session identifier as one of a sender session identifier and a response session identifier, and
    if said session identifier is a response session identifier, checking to see if the session identifier corresponds to that obtained from a pool of available session identifiers,
    wherein the packet is passed up the TCP/IP stack of a node if the session identifier corresponds to its pool, and dropped by a node if the session identifier does not correspond to its pool.

3. A method for enhancing the performance of a load balancing system, the method comprising the steps of
    receiving a packet from a source IP address, the packet including at least a session identifier,
    parsing the received packet to identify at least the session identifier,
    hashing over at least the session identifier to determine which node within the load balancing system will acquire the received packet,
    acquiring the packet by a single node based on the results of the hashing step, wherein all subsequently received packets containing the same session identifier are acquired by the same node, and
    establishing a connection between the source IP address and the destination IP address by allocating a TCP control block for the connection, and
    wherein the steps of acquiring comprises
    verifying the session identifier as one of a sender session identifier and a response session identifier as defined in the Session Mode of operation, and
    if said session identifier is a response session identifier, checking to see if the session identifier corresponds to that automatically assigned by a client/server application residing on a particular node,
    wherein the packet is passed up the TCP/IP stack of a node if the session identifier was assigned by a resident client/server application, and dropped by a node if the session identifier was not assigned by a resident client/server application.

4. A method for enabling sessions established between a client and a server to be uniquely defined, the method comprising the steps of invoking a client-side TCP process, obtaining a unique session identifier for identifying the sessions between the client and the server, forming a packet containing data that includes at least the session identifier, wherein the same session identifier is stored within subsequent packets formed during an established session, transmitting the packet from the source IP address to the destination IP address in order to establish a connection, repeating the steps of invoking, obtaining, forming, and transmitting for the duration of the session, and wherein the step of invoking a client-side TCP process includes generating a FAILURE response, if the client-side TCP process is not enabled to identify and assign the same session identifier to related connections.

5. A method for enabling sessions established between a client and a server to be uniquely defined, the method comprising the steps of invoking a client-side TCP process, obtaining a unique session identifier for identifying the sessions between the client and the server, forming a packet containing data that includes at least a session identifier, wherein the same session identifier is stored within subsequent packets formed during an established session, transmitting the packet from the source IP address to the destination IP address in order to establish a connection, repeating the steps of invoking, obtaining, forming, and transmitting for the duration of the session, and wherein the step of transmitting includes initiating a connection through a three-way hand-shake in which the retrieval of a TCP reset control bit ("RST") packet indicates a destination system that is incapable of processing packets having an affixed header.

* * * * *